United States Patent [19]

Kato et al.

[11] Patent Number: 4,680,791
[45] Date of Patent: Jul. 14, 1987

[54] DIGITAL VIDEO SIGNAL PROCESS APPARATUS FOR USE IN A VIDEO TAPE RECORDER

[75] Inventors: Hideaki Kato; Shigeru Araki, both of Tokyo, Japan

[73] Assignee: NEC Corporation, Japan

[21] Appl. No.: 739,137

[22] Filed: May 30, 1985

[30] Foreign Application Priority Data

May 31, 1984 [JP] Japan ............................... 59-112720
Aug. 22, 1984 [JP] Japan ............................... 59-174739

[51] Int. Cl.$^4$ ............................................ H04N 7/167
[52] U.S. Cl. ........................................ 380/8; 380/20; 380/21
[58] Field of Search ............... 358/114, 118, 123, 339; 178/22.17; 179/1.5 M

[56] References Cited

U.S. PATENT DOCUMENTS

| | | | |
|---|---|---|---|
| 3,921,151 | 11/1975 | Guanella | 178/22.04 X |
| 4,171,513 | 10/1979 | Otey et al. | 179/1.5 M X |
| 4,188,580 | 2/1980 | Nicolai et al. | 179/1.5 R X |
| 4,322,577 | 3/1982 | Brändström | 178/22.05 |
| 4,398,224 | 8/1983 | Watanabe | 358/339 |
| 4,417,283 | 11/1983 | Hoshimi et al. | 358/339 X |
| 4,433,211 | 2/1984 | McCalmont et al. | 178/22.04 X |
| 4,434,323 | 2/1984 | Levine et al. | 179/1.5 S X |

OTHER PUBLICATIONS

Patel, Arvind M., "A Multi-Channel CRC Register", Spring Joint Computer Conference, 1971.
Hsiao et al., "Serial-to-Parallel Transformation of Linear-Feedback Shift-Register Circuits," IEEE Transactions on Electronic Computers, Dec. 1964.

Primary Examiner—Stephen C. Buczinski
Assistant Examiner—Linda J. Wallace
Attorney, Agent, or Firm—Ostrolenk, Faber, Gerb & Soffen

[57] ABSTRACT

A processing apparatus for producing a recording signal from a video signal is disclosed. The video signal is coded to include a plurality of sub-blocks, each of the sub-blocks including a synchronizing code representing a period of the sub-block. Address information varying in content at every sub-block is added to synchronizing code. A pseudo-random signal having a different code pattern with respect to each of the sub-blocks is generated. The video signal is scrambled responsive to the pseudo-random signal.

12 Claims, 8 Drawing Figures

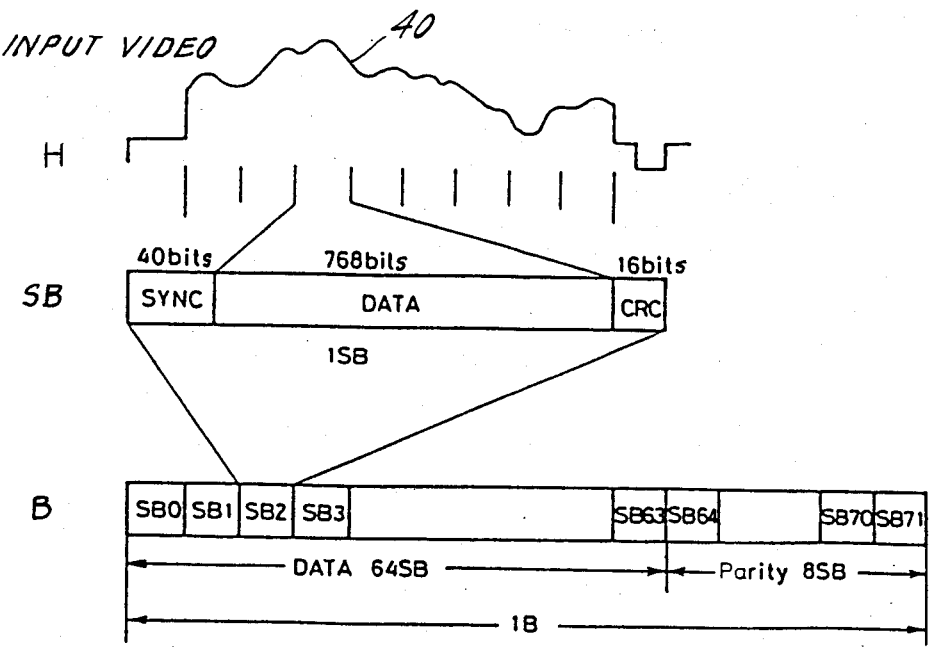
FIG. 3.
FIG. 4a.
FIG. 4b.
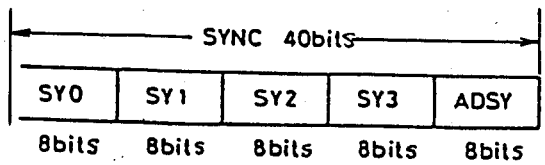
FIG. 4c.

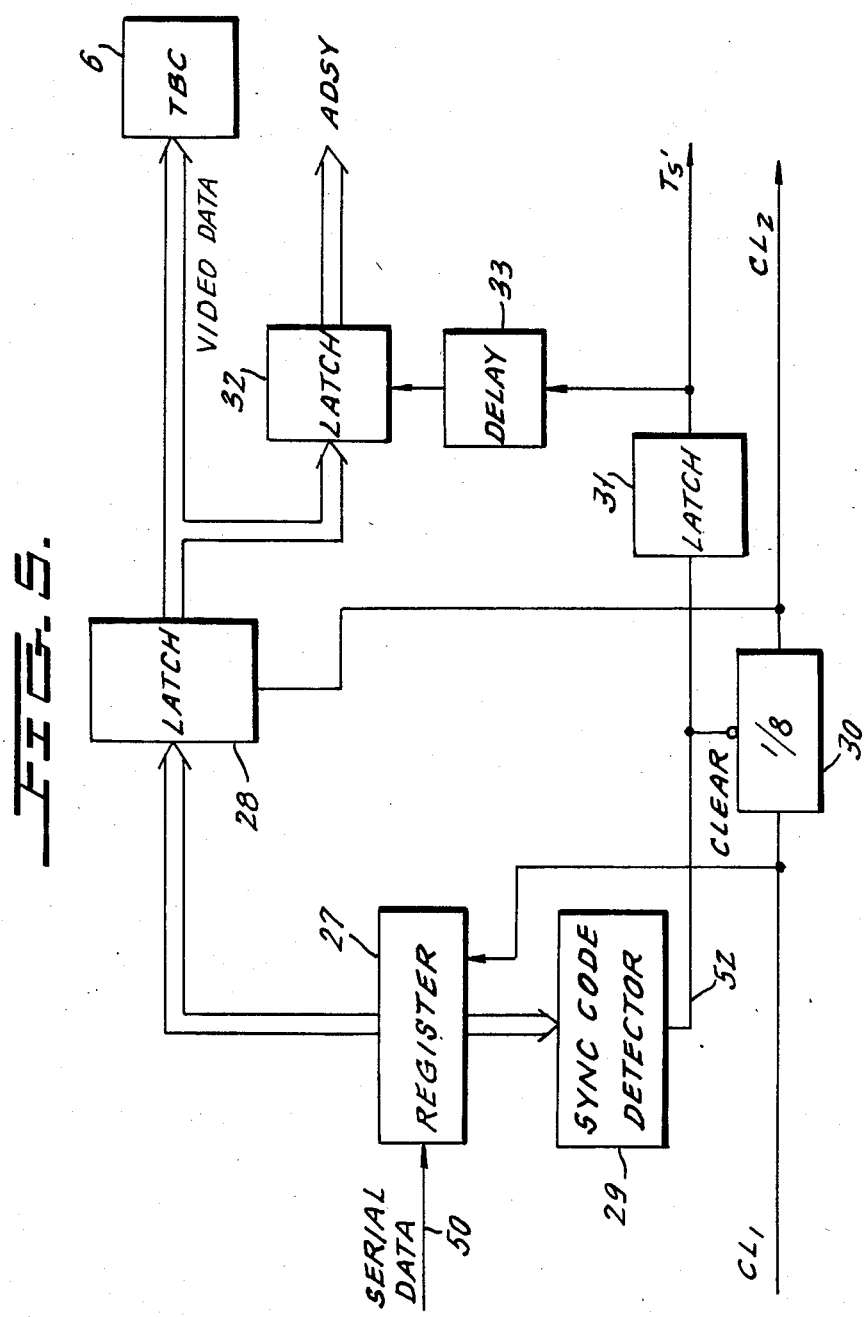

DIGITAL VIDEO SIGNAL PROCESS APPARATUS FOR USE IN A VIDEO TAPE RECORDER

BACKGROUND OF THE INVENTION

This invention relates to a digital signal process apparatus for use in a video tape recorder (VTR), and more particularly to a signal process apparatus for converting a digital signal into a scrambled recording signal format.

In recording a digital video signal, it is well known that NRZ (Non Return to Zero) modulation is effective since its frequency bandwidth is relatively narrow and it is therefore suitable for high density recording. However, since its maximum transition is infinite, a long period of continuous "0"s or "1"s may bring about a lack of reproduced pulses, thus involving difficulty in clock recovery. Accordingly, signal randomization (scrambling) and block-coding are advantageously employed as an available method for limiting the continuous repetition of "0"s or "1"s. However, when a comparatively correlative signal such as a video signal is recorded, specific code patterns are frequently produced which causes a word error, thus deteriorating into a whole error rate. This is well known as a pattern effect. To reduce the pattern effect, the digital video signal is randomized by scrambling, even in cases where block-coding is used. Further, in order to restore an original video signal from a reproduced signal which contains errors arising from so-called drop-out or jitter, a synchronizing code and a check code are added to the digital video signal. In this case, the digital video signal is divided into units each having 200 to 1000 bits, and the synchronizing code and the check code are added to each unit. One unit having the synchronizing code and the check code is treated as one sub-block, and an error correction process is carried for each sub-block.

A jitter of time base is included in a VTR-reproduced signal and corrected by a time base corrector (TBC). In the case of normal speed reproduction, it is enough to have a time base correction range of 2 to 3 sub-blocks for cancelling the jitter in the TBC. However, a time base correction range of several to ten sub-blocks is necessary for shuttle reproduction and slow motion reproduction. Accordingly, two kinds of synchronizing code inserted in the video signal are needed, i.e. one is added for each sub-block and the other is added for a long period which corresponds to the time base correction range of several to ten sub-blocks.

In a prior art system, a random signal process is performed by adding a pseudo-random signal to an input digital video signal in a manner of MOD 2, while the cycle period of the pseudo-random signal corresponds to a synchronous period, i.e., the period of the sub-block or the period of several to ten sub-blocks. However, when the video signal is randomized by using the cycle period of the sub-block, a satisfactory effect is not ensured with regard to the pattern effect, and when the video signal is randomized by the cycle period of the several to ten sub-blocks, the failure to detect the synchronizing code may lead all data into an error condition until the next synchronizing code is correctly detected. Accordingly, there is no suitable scrambling method, which is free from both the pattern effect and the error spread.

SUMMARY OF THE INVENTION

An object of the present invention is therefore to provide a process and apparatus for a digital video tape recorder wherein, by applying only one synchronizing code for each sub-block, a cycle period for randomization is substantially enlarged to a period of several to ten sub-blocks, and mass data can be prevented from being erroneous even when a synchronizing code detection error occurs.

According to the present invention, there is provided a processing apparatus for producing a recording signal from a video signal, the video signal being coded to include a plurality of sub-blocks, each of the sub-blocks including a synchronizing code segmenting each of the sub-blocks; comprising: means for adding address information varying in its content at every sub-block to said synchronizing code, means for generating a pseudo-random signal having a different code pattern with respect to each of the sub-blocks, and means responsive to the pseudo-random signal for scrambling the video signal.

BRIEF DESCRIPTION OF THE DRAWINGS

FIG. 3 is a chart showing a relation among a block and a sub-block both of which are used as embodiments of the invention, and an input video signal of one horizontal period;

FIG. 4(a), FIG. 4(b) and FIG. 4(c) are drawings representing the construction of a synchronizing code used for the embodiment of the invention, and FIG. 5 is a block diagram showing a construction of the decoder in FIG. 1.

DESCRIPTION OF A PREFERRED EMBODIMENT

Figure 1:
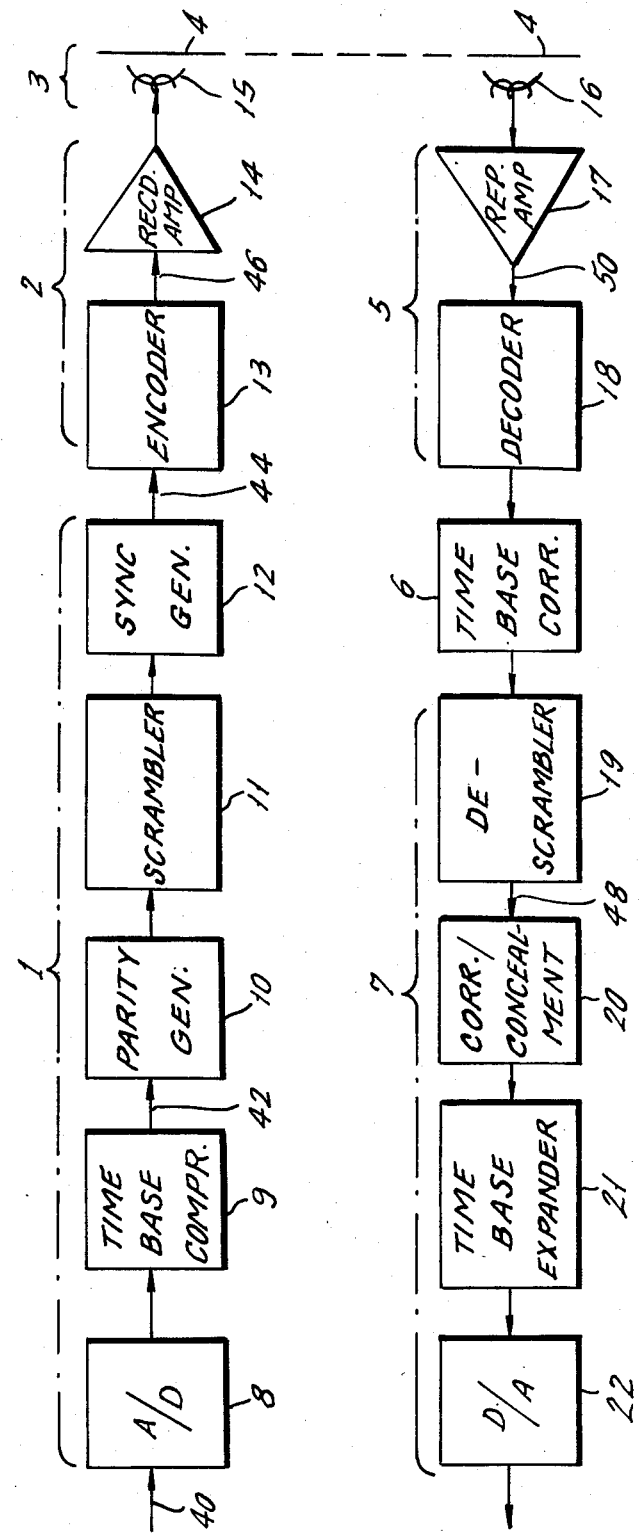
FIG. 1 is a block diagram of an embodiment according to the present invention.

The invention will now be described in detail with reference to the accompanying drawings. FIG. 1 is a block diagram of a PCM-VTR wherein the present invention is applied. The apparatus includes, in series, a record processor 1, a modulator 2, a magnetic head 3, a magnetic tape 4, a demodulator 5, a time base corrector 6 and a reproducing processor 7. The record processor 1 comprises an A/D converter 8, a time base compresser 9, a parity generator 10, a scrambler 11, and a SYNC generator 12. The modulator 2 comprises an encoder 13 and a recording amplifier 14. The magnetic head 3 comprises a recording head 15 and a reproducing head 16. The demodulator 5 comprises a reproducing amplifier 17 and a decoder 18. The reproducing processor 7 comprises a descrambler 19, an error correction/concealment circuit 20, a time base expander 21, and a D/A converter 22.

Figure 2A:
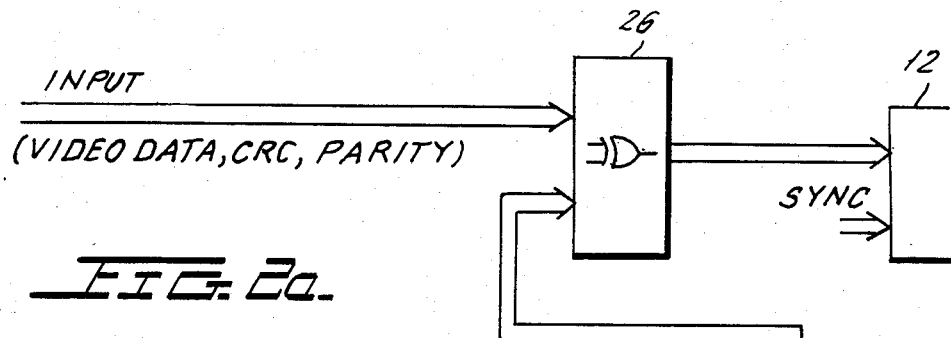
FIG. 2(a) is a block diagram showing a construction of the scrambling circuit and a descrambling circuit of FIG. 1.
Figure 2B:
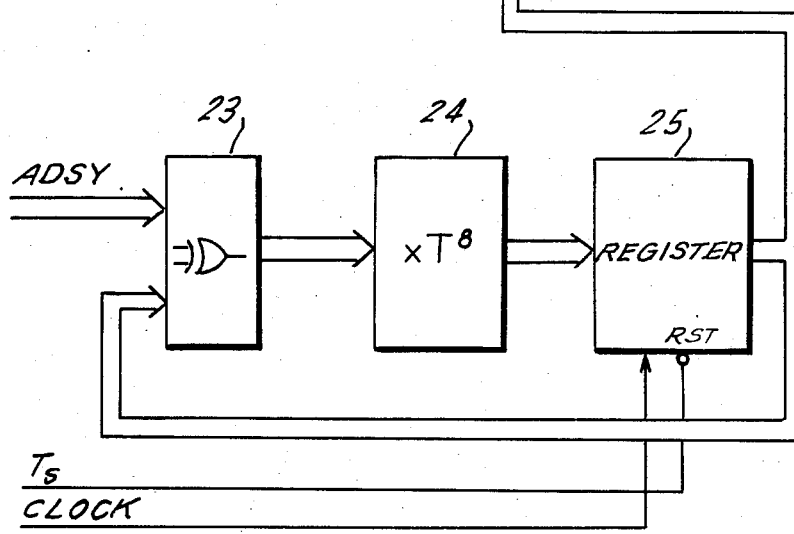
FIG. 2(b) shows a matrix for generating a scrambling signal.

FIG. 2(a) is a block diagram of a circuit applicable to both the scrambler 11 and the descrambler 19 of FIG. 1. This comprises a register 25, an exclusive OR circuit 23 for adding the output of register 25 and a MOD2 encoded address signal ADSY which identifies each sub-block, a matrix calculator 24 for calculating the output from exclusive OR 23 as a function of the matrix of FIG. 2(b), and an exclusive OR circuit 26 for adding the output of the register 25 to the MOD2 encoded input data which includes the video data and the error detection/correction data.

Returning to FIG. 1, input video signal 40 is converted into a digital signal by the A/D converter 8 (FIG. 1), and the digital signal is transformed into a recording signal 42 having a recording format as shown in FIG. 3 by the time base compresser 9. The recording format is constructed as follows. Effective video data of 768 bits (when a sampling frequency of four times subcarrier frequency is used) from one horizontal period (H) is divided into eight equal parts. A synchronizing code (SYNC) of 40 bits and a CRC code of 16 bits are added to each divided part so as to make up a sub-block (SB). A correction code of 8 sub-blocks is then added to each data group of 64 sub-blocks so as to make up a block (B). As a result, one vertical period (V) is composed of 32 blocks. To this end, a signal delivered from the time base compressor 9 is supplied to the parity generator 10 which adds the correction code and CRC code. The output of the parity generator is then supplied to the scrambling circuit 11.

As shown in FIG. 2a, the scrambling circuit 11 can be assembled in a serial byte configuration. The matrix calculator 24 delivers a pseudo-random signal which is obtained by dividing the address signal ADSY sequentially by a generator polynomial $G(X) = X^8 + X^6 + X^5 + X^4 + 1$. In this case, the pseudo-random signal corresponds to a remainder in the aforementioned dividing calculation. The pseudo-random signal is supplied to the register 25 with register 25 being reset by a timing signal Ts which is synchronized with the sub-block. Accordingly, in the pseudo-random signal from the register 25, synchronism is obtainable at each timing signal Ts (sub-block timing). Furthermore, since the address signal ADSY varies according to 72 sub-blocks as shown in FIG. 4 (c), a pseudo-random signal varying in its content at every sub-block is generated. A scrambled signal is then obtained by adding the pseudo-random signal to the input signal in a manner of MOD2 in the exclusive OR circuit 26. The synchronization code (SYNC) shown in FIG. 4 (a) is added to the scrambled signal in the SYNC generator 12 (FIG. 1). As shown in FIGS. 4 (a), 4 (b) and 4 (c), the SYNC signal comprises 5 bytes (40 bits), which includes 4 bytes of address data (SY0 to SY3) all common and 1 byte of the address signal ADSY varying in its content at every sub-block SB. The output 44 of the SYNC generator 12 is converted into the recording signal 46 by the encoder 13, and the recording signal 46 is supplied through the recording amplifier 14 to the recording head 15.

Information recorded on the magnetic tape 4 is extracted as a reproduced signal from the reproducing head 16, and through the reproducing amplifier 17, it is supplied to the decoder 18, where the SYNC signal is detected and the reproduced signal is converted into a parallel form. The output of the decoder 18 is subjected to correction of any time base error in the time base corrector 6 and is then returned to the source video signal by the descrambler 19. The descrambler 19 can be comprised of the same circuit as the scrambler 11 of FIG. 2a. The signal thus obtained 48 is supplied to the correction/concealment circuit 20 where any errors contained therein are removed. The output of circuit 20 is then supplied to the time base expander 21 with the time-expanded signal from the expander 21 converted into an analog video signal by the D/A converter 22.

FIG. 5 is a block diagram of the decoder 18. In this Figure, the input signal 50 delivered from the amplifier 17 is supplied to a register 27, where it is converted into an 8-bit parallel data, and then transmitted through the latch circuit 28 to the time base corrector 6 (FIG. 1). The output of the register 27 is also sent to a synchronism detection circuit 29, where the synchronizing code elements $SY_0$, $SY_1$, $SY_2$, and $SY_3$ are detected and thus, each sub-block is detected in accordance with the detected result. On the other hand, a reproduced clock signal $CL_1$ extracted from the reproduced signal of the reproducing head 16 (FIG. 1) is sent to a frequency divider 30, where it is divided by 8 which produces a clock signal $CL_2$ for the 8-bit parallel data. The synchronism detection output from the synchronism detection circuit 29 is used for clearing the frequency divider 30, and is also delivered through a latch circuit 31 thereby producing a synchronizing timing signal Ts'. The parallel data from the latch circuit 28 is sent further to a latch circuit 32. The latch timing of the latch circuit 32 is adjusted to that of the address signal ADSY by a delay circuit 33 which therefore extracts the address signal ADSY. The address signal ADSY, delivered from the latch circuit 32 is used for discriminating each sub-block.

If the prior art is applied, in the time base corrector 6, a write address is formed by using only the synchronizing timing signal Ts' and the clock signal $CL_2$ of FIG. 5. Therefore, when there occurs a detection error in the synchronizing code, all data of the period of several to ten sub-blocks becomes erroneous as described above. However, according to the present invention, the write address in the time base corrector 6 can be produced in response to the address signal ADSY, and thus an error can be limited within one sub-block period. This feature of the present invention is very effective in practice. Further, as shown in FIG. 2, a pseudo-random signal is formed by modifying its content in accordance with the address signal ADSY, and therefore the pattern effect is not derived in the present invention. This feature is also very advantageous in comparison with the prior art.

As described above, according to the present invention, since the pseudo-random signal varies at every sub-block and the cycle period of the pseudo-random signal is substantially enlarged to the period of several to ten sub-blocks, the undesirable influences of the pattern effect and subsequent error occurrence can be effectively removed and/or limited.

What is claimed is:

1. A processing apparatus for producing a scrambled signal from a video signal, said video signal being coded to include a cyclic error correcting code, said video signal being organized in a plurality of blocks, each block having a plurality of sub-blocks, each of said sub-blocks including a synchronizing code representing a period of said sub-block, said apparatus comprising:
   means for adding address information varying in its content at every sub-block to said synchronizing code;
   means, responsive to said address information, for generating a pseudo-random signal based on said address information and having a different code pattern with respect to each of said sub-blocks; and
   means responsive to said pseudo-random signal for scrambling said video signal with said pseudo-random signal.

2. A digital signal recording/reproducing system, comprising:
   recording process means for adding a parity bit to an input digital video signal having a plurality of blocks so as to produce a digital signal containing parity bits, each of said blocks being constructed of a plurality of sub-blocks;

scrambling means for adding a pseudo-random signal to said digital signal containing parity bits so as to produce a scrambled signal;

synchronizing code adding means for adding a synchronizing code for each sub-block of said scrambled signal so as to generate a scrambled signal which is based in part on said synchronizing code, each said synchronizing code including address information for identifying a respective one of said sub-blocks associated therewith;

modulating means for modulating said scrambled signal containing said synchronizing code so as to produce a recording signal;

means for recording said recording signal onto a magnetic recording medium;

means for reproducing said recording signal from said magnetic recording medium;

demodulating means for demodulating said reproduced signal so as to derive a clock signal and a demodulated signal;

time base correcting means for correcting any time base errors contained in said demodulated signal so as to generate a demodulated signal devoid of any time base errors;

descrambling means for adding said pseudo-random signal to said demodulated signal devoid of time base errors so as to generate a descrambled signal; and restoring process means for restoring a digital video signal in response to said descrambled signal;

wherein said pseudo-random signal has a different bit pattern for each of said sub-blocks, and said pseudo-random signal is modulated by said address information whereby the respective portion of said pseudo-random signal associated with any given one of said sub-blocks depends in part on the address information value of said given one of said sub-blocks.

3. A digital signal recording/reproducing system as claimed in claim 2, further including means for modifying said pseudo-random signal in response to said address information.

4. A processing apparatus for processing a digital video signal, comprising:

means for coding said digital video signal into a coded video signal, said coded video signal being constructed of a plurality of blocks and being encoded in accordance with a cyclic error correcting code, each block having a plurality of sub-blocks and parity bits, and each of said sub-blocks having video data and a synchronizing code;

means for scrambling said coded video signal by adding a pseudo-random signal thereto, said pseudo-random signal having a cycle period corresponding to said block, said random signal having a different bit pattern with respect to each sub-block; and means for adding address information to said synchronizing code so as to identify each said sub-block.

5. A device according to claim 4, wherein said pseudo-random signal is produced in response to said address information.

6. A processing apparatus for producing a recording signal from a digital video signal, said digital signal having a cyclic error correcting code format, said format being constructed of a plurality of blocks, each said block including a plurality of sub-blocks, said apparatus comprising:

means, responsive to a unique address information provided with each one of said sub-blocks, for generating a pseudo-random signal having a different code pattern with respect to each of said sub-blocks, said signal being dependent on said address information;

means responsive to said pseudo-random signal for scrambling said digital video signal to produce a scrambled digital video signal; and means for adding a synchronizing code designating a period of each one of said sub-blocks to said scrambled digital video signal to produce said recording signal, said synchronizing code containing said address information.

7. A processing apparatus as claimed in claim 6, wherein said pseudo-random signal generating means includes:

exclusive-OR gate means having a first input and a second input, said first input receiving said address information; and matrix means coupled to said exclusive-OR gate means for converting an output of said exclusive-OR gate means on the basis of a predetermined generator polynomial to produce a pseudo-random signal, said pseudo-random signal being supplied to said second input of said exclusive-OR gate means.

8. A scrambling circuit for encoding a video signal, said video signal being of the type which is divided into a plurality of blocks, each block being further subdivided into a plurality of sub-blocks, each sub-block having a plurality of fields including a sync field, a data field and an error correction field, said circuit comprising:

means for generating and appending to each one of said sub-blocks a unique address field for identifying said sub-block;

a pseudo-random source for supplying a sequence of pseudo-random values;

means for modulating the pseudo-random values with the address information associated with said sub-blocks, and for generating a pseudo-random signal comprised of said sequence of said pseudo-random values modulated by said address information; and means for scrambling at least said data field with said pseudo-random signal.

9. The circuit of claim 8, further comprising means for appending a respective one of said address field to each one of said sub-blocks subsequent to the scrambling of said sub-block with said pseudo-random signal.

10. The circuit of claim 9, wherein said sequence of random values is generated in accordance with a generator polynomial generating function.

11. The circuit of claim 10, further comprising decoding means for decoding said video signal from said encoded video signal.

12. The circuit of claim 11, further comprising means for deriving from said scrambled video signal a clock signal for synchronizing said scrambling circuit and said decoding means to one another.

* * * * *